United States Patent [19]

Kundinger et al.

[11] Patent Number: 4,578,303

[45] Date of Patent: Mar. 25, 1986

[54] FIBER COMPOUND STRUCTURAL COMPONENT AND METHOD FOR MAKING SUCH A COMPONENT

[75] Inventors: Josef Kundinger; Claus Hohmann; Martin Mühleck, all of Donauwörth, Fed. Rep. of Germany

[73] Assignee: Messerschmitt-Boelkow-Blohm Gesellschaft mit beschraenkter Haftung, Munich, Fed. Rep. of Germany

[21] Appl. No.: 597,931

[22] Filed: Apr. 9, 1984

[30] Foreign Application Priority Data

Apr. 27, 1983 [DE] Fed. Rep. of Germany ....... 3315246

[51] Int. Cl.$^4$ .......................... B32B 3/12; G02B 5/08
[52] U.S. Cl. ...................... 428/116; 52/806; 156/292; 428/912.2
[58] Field of Search ................. 428/72, 73, 116, 118, 428/117, 912.2; 156/197, 292; 52/812, 806, 786

[56] References Cited

U.S. PATENT DOCUMENTS

| 2,477,852 | 8/1949 | Bacon | 156/292 X |
|---|---|---|---|
| 3,212,189 | 10/1965 | Savit | 428/116 X |
| 3,444,568 | 5/1969 | Vogelsang | 428/116 X |
| 3,458,977 | 8/1969 | Young et al. | 428/116 X |
| 3,644,022 | 2/1972 | Jagdt et al. | 428/116 X |
| 3,713,959 | 1/1973 | Rottmayer et al. | 428/116 X |
| 3,740,301 | 6/1973 | Manning et al. | 428/116 X |
| 4,255,364 | 3/1981 | Talbert | 428/912.2 X |
| 4,447,130 | 5/1984 | Christiansen et al. | 52/806 X |

FOREIGN PATENT DOCUMENTS 2836418 8/1978 Fed. Rep. of Germany.

OTHER PUBLICATIONS

"Leichtbau", pp. 274 and 275.

Primary Examiner—Henry F. Epstein
Attorney, Agent, or Firm—W. G. Fasse; D. H. Kane, Jr.

[57] ABSTRACT

A fiber compound structural component, for example a radio telescope mirror, having a curved surface is constructed to have a homogeneous heat expansion characteristic throughout its entire volume. For this purpose a hollow, honeycomb type core is made of the same fiber compound material as the cover layers between which the preassembled core is sandwiched. The core is first assembled by cutting already cured or hardened core elements of a fiber compound material into suitable shape and/or length and then interconnecting these core elements to form the honeycomb type core to have the curved surface as a result of the cutting. The cover layers are secured to the curved core by using so-called prepregs or preimpregnated fiber compound material of the same type as the core elements and curing the cover layers whereby the curing bonds the cover layers to the core. A mold may be used for laminating the cover layers to the core. The mold may be of the same type fiber compound material or of ceramic.

4 Claims, 4 Drawing Figures

FIBER COMPOUND STRUCTURAL COMPONENT AND METHOD FOR MAKING SUCH A COMPONENT

FIELD OF THE INVENTION

The invention relates to a fiber compound structural component and to a method for making such a component. More specifically, such structural components of fiber compound material have a honeycomb type preassembled core sandwiched between two outer cover layers forming at least one curved surface. Typical examples of such structural components would include large telescope mirrors, including radio telescope mirrors, antennas and the like.

BACKGROUND OF THE INVENTION

It is known to construct lightweight structural components of high mechanical strength in the form of a sandwich type structure having upper and lower cover sheets made of fiber compound materials with a honeycomb type core sandwiched between the cover sheets, whereby the core is usually made of metal, mostly aluminum which is glued to the cover sheets. The use of a honeycomb type core made of aluminum or similar material suitable for forming a supporting core has the advantage that it may be relatively simply deformed prior to the curing or hardening of the cover layers made of fiber compound materials provided that the deforming remains within certain limits. Accordingly, it is possible to construct the sandwich type structural components with a curved surface in an economical manner.

However, it has been found that problems arise where the different thermal expansion coefficients of the cover surface material and of the core material can result in a deformation of the curved surface, especially where the structural component is exposed to temperature variations under which it becomes unable to retain its dimensional stability, especially with regard to the shape of its curved surface. Such deformations have been found to occur, especially where the cover layers have been made of high strength carbon fibers having an extremly low heat expansion coefficient while the core is made of a material having a larger heat expansion coefficient. Thus, in connection with radio telescope mirrors having, for example, a diameter of more than ten meters, and being assembled of a plurality of paraboloidal mirror segments it has been difficult heretofore to assure a constant, exact focusing due to different heat expansions of the core relative to the curved surface when such mirrors are exposed to large temperature differences during the course of a day. Similar problems have been encountered where the molding tools for the formation of such mirror segments are also to be produced as sandwich components with fiber compound material cover layers because such molding tools may also be exposed to different temperatures during the manufacturing process of the structural components such as mirror segments or the like.

OBJECTS OF THE INVENTION:

In view of the above it is the aim of the invention to achieve the following objects singly or in combination:

to construct a structural component as described herein in such a manner that it may be economically produced while simultaneously assuring a highly effective dimensional and form stability even when such components are exposed to substantial temperature variations;

to construct a cost effective radio telescope mirror which maintains a constant, exact focusing ability over prolonged periods of time under varying temperature conditions;

to construct a molding tool which has a constant form stability even under temperature conditions required for a molding or curing operation;

to construct a structural component of the type disclosed herein in such a way that the use of complicated molding tools may be obviated;

to avoid the need for a surface machining operation of these structural components; and to form the core of already cured fiber compound panels or sectional stock.

SUMMARY OF THE INVENTION

According to the invention there is provided a structural component of fiber compound material having a honeycomb type preassembled core sandwiched between two outer cover layers having at least one curved surface and comprising a plurality of core elements so precut out of already cured fiber compound material that an assembly of the core elements forms said at least one curved surface, whereby the core elements and the cover layers are made of the same fiber compound material. The core elements are interconnected with each other either by mechanical means and/or by an adhesive bond. Further, the cover layers are bonded to the preassembled core either by curing the fiber compound material cover layers to the core after laminating these cover layers to the core or by an adhesive bond.

In one embodiment the core is made of comb shaped ribs cut out of flat fiber compound material, after such material has been cured in the form of panels or the like. The ribs are provided with teeth spaced by slots for interlocking or interconnecting a plurality of such ribs to form the core of interconnected ribs. Each of the ribs has at least one curved edge, whereby the curved edges of the ribs of a core together define the curved surface when the ribs are assembled in a cross-over interlocking manner to form the core. The slotted comb type ribs grip into each other in a location fit or formlocking manner and the resulting intersections may further be bonded by a suitable adhesive. The fiber orientation in the panels from which the ribs are cut is preferably such that the fibers cross each other and the shape of each rib accommodates the desired shape of the surface curvature. This type of structure has the advantage that it does not require any molding tool because the shape of the surface curvature is already determined by the curved edges of the ribs forming the core. Further, the so assembled cores do not require any machining operation which further reduces their costs. This in turn has the advantage that the individual ribs may be rather thin. Surprisingly, a very satisfactory dimensional and shape stability is assured nevertheless.

According to a second embodiment the core elements may be made by cutting off sections from tubular stock of fiber compound material. The cut off sections are then assembled to form the core and glued to each other, whereby the different lengths of the cut-off sections enables the formation of the curved surface. The cutting off takes place after the curing or hardening of the fiber component sectional stock such as tubular stock. Such stock may comprise several layers of fiber compound material with a desired fiber orientation, for example, at a slant relative to the longitudinal direction of the tubular stock. The fibers may cross each other and/or they may extend in parallel to each other. One of the cover layers then takes up any steps between the different lengths of core elements or sections. It is also possible to cut these sections at a slant so that the slant will extend tangentially to the surface contour of the structural component. A further advantage of this embodiment is seen in that the strength characteristics may be adapted over the entire surface to particular requirements by using core sections of different diameters in different zones or areas of the structural component. By slanting at least one end of the core sections and by using core sections of different diameters such that smaller section diameters are used where the slope or slant of the curved surface is larger, it is also possible to minimize the steps between adjacent core sections so as to provide the curved surface with a uniform or uninterrupted or steady curvature.

In order to lock the core ribs or core sections against displacement prior to laminating the cover layers to the core, and in order to improve the mutual stiffening effect of the core elements relative to each other in the finished product, it may be desirable to glue the ribs or core sections to one another prior to laminating the cover layers to the core.

Carbon fiber reinforced fiber compound materials have been found to be suitable for the present purposes.

Where an extremely high precision must be met or satisfied by the curvature of the curved surface, for example, in connection with a radio telescope mirror, it is preferable that the curing or at least the initial curing of the particular curved surface layer takes place on the surface of a mold having the desired curved surface geometry and being able to maintain it.

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
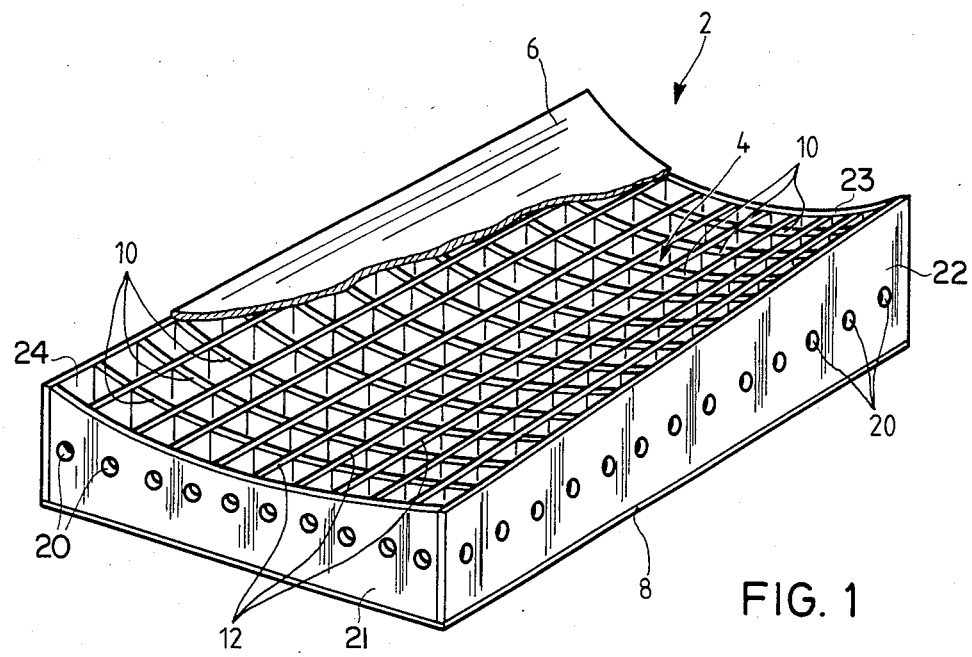
FIG. 1 is a schematic perspective view of a fiber compound sandwich type structural component comprising cover layers and a plurality of individual ribs assembled to form a core sandwiched between the cover layers, whereby the upper cover layer is shown partially broken away to reveal the core structure.
Figure 2:
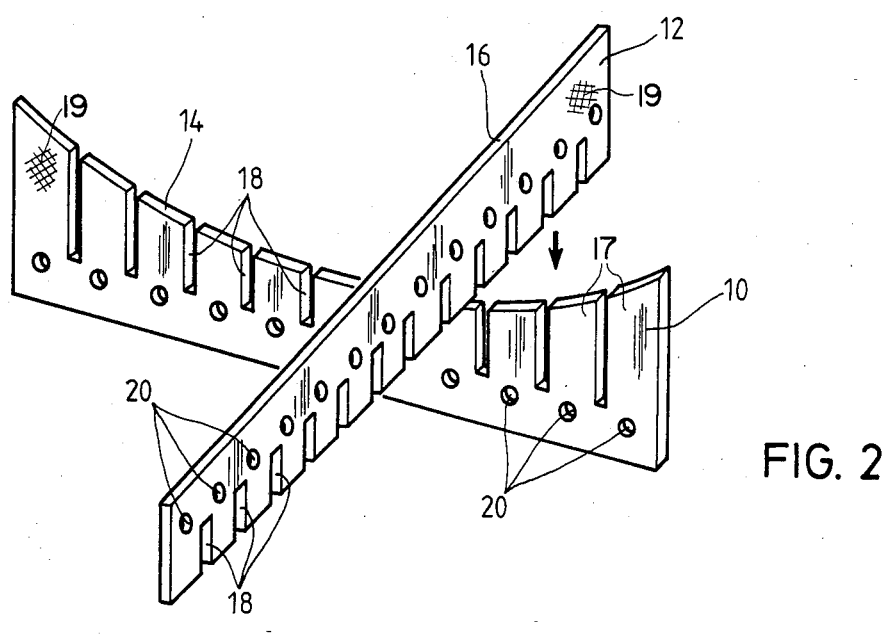
FIG. 2 shows a perspective illustration of two core ribs just prior to their interconnection.

The structural component 2 shown in FIGS. 1 and 2 comprises an inner honeycomb type support core 4 sandwiched between an upper cover layer 6 and a lower cover layer 8. At least one surface, in the shown example it is the upper surface 6, has a curved surface configuration forming a paraboloidal section. The honeycomb core 4 is made of the same fiber compound material as, the cover layers 6 and 8, preferably of carbon fiber compound or composite material embedded in a suitable resin matrix.

FIG. 2 illustrates the assembly of the core 4 from a plurality of core elements comprising comb shaped ribs 10 extending cross-wise and further comb shaped ribs 12 extending lengthwise. These ribs 10 and 12 are cut from fiber compound material which may be relatively thin and which has been cured prior to the cutting, for example in the form of panels or the like. Each rib 10, 12 has teeth 17 separated by slots 18 for interlocking a plurality of such ribs to form the core. Each of the ribs has at least one curved edge providing a core shape defining contour, whereby all the curved edges of the ribs together define the curved surface covered by the upper cover layer 6 as shown in FIG. 1 when the ribs are assembled in a cross-over interlocking relationship as shown. The ribs 10 extend in parallel to each other and form a first set of ribs located in planes extending perpendicularly to the axis of symmetry of the paraboloid. Accordingly, the ribs 10 have a curved edge 14 adjacent to the teeth 17. The curved edge 14 is part of a circle. The longitudinal ribs 12 also extend in parallel to one another, but their edge 16 opposite the teeth 17 is curved in accordance with the generatrix of the paraboloidal surface, said generatrix being a parabola.

As mentioned, the ribs 10, 12 are cut, for example, by sawing out of a thin walled, cured fiber compound panel in which the fibers have a cross-over orientation in such a way that in the cut out ribs 10, 12 the fibers extend at an angle to the longitudinal direction of the ribs as shown at 19 in FIG. 2. Due to the slots 18 it is possible to intermesh the ribs 10 and 12 with each other in a mutually interlocking location fit or form-locking fit which may be further reinforced by providing an adhesive bonding at some or all of the intersections. Thus, a shape retaining strong honeycomb type core 4 is formed, whereby the outer or end walls 21, 22, 23, and 24 are glued to the respective end edges of the ribs 10, 12. Prior to the assembly of the core, the end walls 21, 22, 23, 24 and the ribs 10, 12 are provided with perforations 20 which assure an unimpeded pressure equalization in all chambers of the core 4 relative to one another and to the environment. Such pressure equalization is especially advantageous when several such core sections are assembled to form a molding tool for laminating at least one of the cover layers to one surface of the core as shown, for example in FIG. 4. Such molding tool 224 is inserted into an autoclave under pressure and heat conditions for curing the cover layers, thereby bonding the cover layers to the core.

Figure 3:
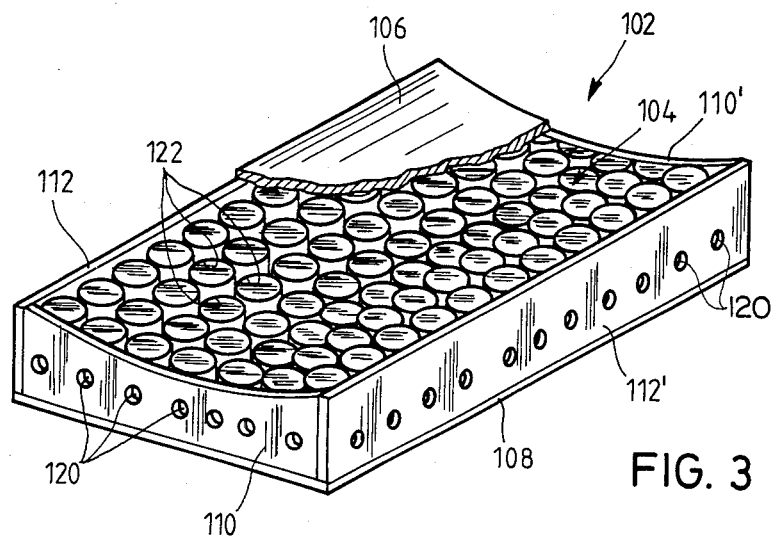
FIG. 3 is a view similar to that of FIG. 1, however, showing a modified core construction comprising a plurality of core sections cut from a profiled member such as a sectional tubular member.

FIG. 3 illustrates an embodiment in which the core elements comprise a plurality of sections cut off from a profiled member such as a tubular section. These tubular sections are made of the same fiber compound material as the cover layers, thus, the core 104 comprises a plurality of tubular sections 122 having, for example, a circular cross-section standing upright and glued or adhesively bonded to each other along their contact surface portions. The sections 122 are also preferably cut from longitudinal tubular stock after the fiber compound material of which the stock is made has been cured. The longitudinal side walls 112 and 112' as well as the end walls 110 and 110' are also glued to the core sections 122. Here again, the preferred fiber compound material comprises carbon fibers embedded in a suitable resin matrix. The end edges of these core sections, after the assembly of the core sections to form the core, participate in defining the core shape or contour.

Figure 4:
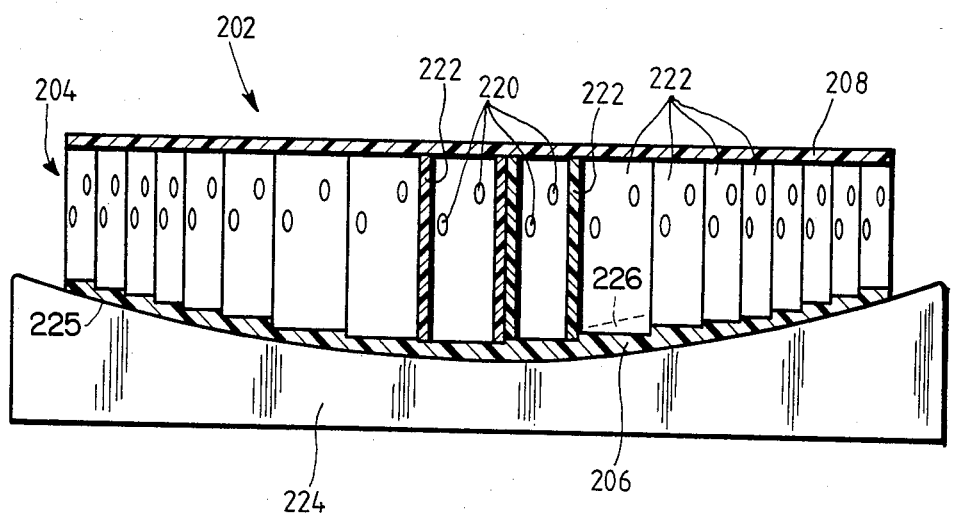
FIG. 4 is a view partially in section, of a sandwich type structural component similar to that of FIG. 3, however, assembled on a mold for laminating one of the cover layers to the structural component.

As best seen in FIG. 4, the individual core sections are cut to have different lengths in order to provide the curvature of the cover sheet 106. The upper cover layer 108 may be a plane cover-sheet or it may also be curved, if desired. The side walls 112, 112', 110, 110' and the core sections 122 are again provided with perforations 120 for the purpose of pressure equalization. The curved lower cover layer 106 and the upper cover layer 108 are laminated to the core assembly in the uncured state. Thus, after curing of the cover layers they are bonded to the end edges of the core sections 122 and to the edges of the wall members 110, 110', 112, 112' as a result of the curing.

In FIG. 4 the structural component 202 has a core 204 also formed of tubular core sections 222 arranged in groups. The core 204 is covered by a curved cover layer 206 having a convex curvature formed in a mold 224 provided with a correspondingly concave molding surface 225. The opposite side of the core 204 is covered by a cover layer 208. By cutting the core sections 222 so that they have different lengths in different groups of core sections, the curvature of the cover layer 206 may be formed, whereby the cover layer 206 in its uncured state is sufficiently soft to accommodate the slight steps between adjacent groups of core sections. In this connection it is, however, also possible to cut the core sections at one end at a slight slant as shown by the dashed line 226 in FIG. 4.

The individual core sections 222 also have different diameters in different core section groups as best seen in FIG. 4. The core sections of largest diameter are located where the slope of the cover sheet 206 is smallest, namely, substantially in the center of the core 204. Outwardly from the center, the diameter of the core sections gets smaller and smaller as the slope of the cover sheet 206 increases. By selecting the diameter of the core section, it is possible to satisfy localized strength requirements of these structural components. Further, making the diameter of the core sections 222 smaller in the radially outward direction also makes the individual steps somewhat smaller, whereby it is possible to keep these steps within predetermined limits. Further, it is possible in this way to avoid any deformation of the outer contour of the cover sheet 206. As shown in the embodiment of FIG. 4 this outer contour is convex, for example. Smaller diameter core sections in combination with a slanted end will accommodate almost any curvature.

Where a precise outer surface contour is required, it is preferable to use the above mentioned mold 224 for the laminating step in which the cover layer 206 is secured to the core 204. In this embodiment the cover layer 206 in its uncured state, for example, in the form of a so-called prepreg is first placed on the concave surface 225 of the mold 224. Incidentally, the mold 224 may be a structure as shown in FIG. 3. The core structure 204 has been separately assembled and the core sections have been glued to each other so that now it is possible to place the entire core as a unit onto the core facing surface of the cover layer 206. The cover layer 206 may be formed by several laminations and the core 204 is pressed into these so far uncured laminations. Thereafter, the other cover layer 206 is applied and the assembly with the mold 224 is placed into an autoclave for applying the proper pressure and heat for curing the cover layers 206 and 208 to bond them to the core 204.

By using a mold 224 of the same construction as disclosed herein, the advantage is achieved that the required curing temperatures and time durations may be applied without any danger that different heat expansion characteristics could result in a deformation of the surface contour of the cover layer 206. For these purposes the mold 224 is made of the same fiber material as the sandwich structure 202.

However, the invention is not limited to the use of a mold made of the same fiber compound material. It is, for example, also possible to use the structural component 204 as a mold for producing in turn structural components as are shown in FIGS. 1 and 3 having a concave surface contour. In any event, it is possible to make the mold of metal or of ceramic material.

It is also possible to cure the present structural components, or rather the cover layers thereof, at relatively low temperatures, for example the laminating steps may be done at room temperature followed by a tempering at a relatively low temperature of about 40° C, whereby the structural component or rather, its sandwich structure, receives a surface contour which is free of any thermal deformations. A structural component cured at relatively low tempering temperatures has the required dimensional and contour stability as well as the required temperature stability for use as a mold in the subsequent temperature curing of a structural component. If the mold 224 is made of ceramic having approximately the same heat expansion coefficient as the carbon fiber compound material, it is possible to cure the structural component 202, if desired, while in place on the mold 224 at the normal curing temperature of about 120° C. In such an instance the heat application curing cycles will be slowed down, which means that the heat up will take place sufficiently slowly in order to avoid exposing the ceramic mold 224 to unpermissible heat stress.

In any event, it has been found to be possible to use the structural component 202 as a mold for curing another structural component by tempering and/or with the aid of the slowed down high temperature curing. The structural component 202 has been found to have the required mechanical and thermal stability for such use as a mold in an autoclave in which the mold is exposed to the usual curing temperatures and cycles under which the molds according to the invention satisfy the highest strength and contour stability requirements.

Although the invention has been described with reference to specific example embodiment, it will be appreciated, that it is intended to cover all modifications and equivalents within the scope of the appended claims.

What is claimed is:

1. A method for manufacturing a structural component of fiber composite material and having at least one surface with a contour curved in space, comprising the following steps:
    (a) curing flat fiber composite material to produce cured, flat fiber composite panels,
    (b) cutting said cured, flat fiber composite panels into two sets of already cured ribs so that each rib in both sets has a first edge conforming along its length to said contour curved in space and a second opposite edge,
    (c) cutting slots into one set of ribs so that said slots extend from said first conforming edge into the respective rib,
    (d) cutting slots into the other set of ribs so that said slots extend from said opposite edge into the respective rib, (e) assembling said first and second sets of already cured ribs by intersecting the ribs of one set with the ribs of the other set with the aid of said slots and interconnecting said ribs to form a rigid, cured core of cured fiber compound material having a honeycomb type configuration with an effective dimensional and form stability as a result of said ribs being already cured, (f) laminating uncured sheet means of the same fiber composite material as said ribs onto said rigid, cured core to form at least one cover, and (g) curing said uncured sheet means to thereby bond said cover to said rigid, cured core to form said structural component in which said cover assumes said contour curved in space without any machining operations, whereby said structural component is free of internal stress when said structural component is exposed to changing temperatures.

2. A method for manufacturing a structural component of fiber composite material and having at least one surface with a contour curved in space, comprising the following steps:

(a) cutting already cured sectional stock of said fiber composite material into cured pieces of different lengths, each cured piece having a longitudinal axis and a first and second end, (b) assembling said cured pieces next to each other with said longitudinal axes extending in parallel to each other in such a manner that said first ends of all assembled cured pieces together substantially define said contour curved in space and so that all second ends together form another surface of said structural component, (c) adhesively bonding said cured pieces to each other to form a rigid, cured core of cured fiber composite material having a honeycomb type configuration with an effective dimensional and form stability as a result of said pieces being already cured, (d) laminating uncured sheet means of the same fiber composite material as said sectional stock, onto said rigid, cured core to form at least one cover, and (e) curing said uncured sheet means to thereby bond said cover to said rigid, cured core to form said structural component in which said cover assumes said contour curved in space without any machining operations, whereby said structural component is free of internal stress when said structural component is exposed to changing temperatures.

3. A structural component of fiber composite material and having at least one surface with a contour curved in space manufactured according to claim 1.

4. A structural component of fiber composite material and having at least one surface with a contour curved in space manufactured according to claim 2.

* * * * *